US005457633A

United States Patent [19]

Palmer et al.

[11] Patent Number: 5,457,633

[45] Date of Patent: Oct. 10, 1995

[54] APPARATUS FOR LIMITING HORSEPOWER OUTPUT OF AN ENGINE AND METHOD OF OPERATING SAME

[75] Inventors: Marvin K. Palmer, Oswego; Rick D. Vance, Washington, both of Ill.

[73] Assignee: Caterpillar Inc., Peoria, Ill.

[21] Appl. No.: 200,976

[22] Filed: Feb. 24, 1994

[51] Int. Cl.[6] .......... G01L 3/00

[52] U.S. Cl. .......... 364/431.09; 364/426.01; 364/431.03; 364/431.01; 364/431.05; 60/39.281; 60/39.04; 60/39.25; 60/445; 60/39.03; 60/39.163; 180/197; 180/282; 477/30; 477/181

[58] Field of Search .......... 364/431.01, 426.01, 364/431.03, 426.02, 431.02, 431.09; 180/197, 282; 477/30, 181; 60/39.04, 39.25, 39.281, 445, 489, 490, 39.161, 39.03, 39.163; 123/364, 500

[56] References Cited

U.S. PATENT DOCUMENTS

| | | | |
|---|---|---|---|
| 4,244,181 | 1/1981 | Wiher et al. | 60/39.281 |
| 4,266,401 | 5/1981 | Sumegi et al. | 60/39.25 |
| 4,269,027 | 5/1981 | Mattson et al. | 60/39.281 |
| 4,274,254 | 6/1981 | Jansen et al. | 60/39.25 |
| 4,275,558 | 6/1981 | Hatch et al. | 60/39.161 |
| 4,371,050 | 2/1983 | Ikeura | 364/431.09 |
| 4,531,492 | 7/1985 | Gibson | 123/364 |
| 5,121,324 | 6/1992 | Rini et al. | 364/431.05 |
| 5,261,366 | 11/1993 | Regueiro | 123/478 |
| 5,277,156 | 1/1994 | Osuka et al. | 123/456 |

*Primary Examiner*—Kevin J. Teska
*Assistant Examiner*—Jacques H. Louis-Jacques
*Attorney, Agent, or Firm*—R. Carl Wilbur

[57] ABSTRACT

A horsepower limiting engine control limits the maximum engine horsepower output during operating conditions that might result in torque outputs that are greater than the transmission component ratings. The control includes an electronic controller connected to solenoid driver circuitry, an engine speed sensor and a gear selector. The solenoid driver circuitry energizes a solenoid in response to an engine speed less than a first predetermined engine speed value. The solenoid causes a moveable stop to retract permitting the engine to produce full rated power. The electronic controller causes the solenoid circuitry to de-energize and extend the moveable stop in response to the engine speed exceeding a second predetermined engine speed value and the gear selector being in a predetermined position.

22 Claims, 2 Drawing Sheets

APPARATUS FOR LIMITING HORSEPOWER OUTPUT OF AN ENGINE AND METHOD OF OPERATING SAME

TECHNICAL FIELD OF THE INVENTION

The present invention relates to electronically controlled internal combustion engines, and more particularly, to a fuel rack limit that reduces engine horsepower which limits maximum torque converter output to protect transmission and other powertrain components from being subjected to high torque levels.

BACKGROUND OF THE INVENTION

In heavy equipment and other machinery having an engine, torque converter, transmission, driveline, axles and an earth moving implement, it is important to match the power output of the engine with the torque capability of the powertrain components. For example, if the engine produces power above the rating of the powertrain components, then the powertrain components may deteriorate and fail sooner than expected. However, selecting powertrain components with a power rating that exceeds the power output of the engine and torque converter increases the cost of the powertrain components. Thus, it is advantageous to match the power output of the engine and torque converter closely to the torque ratings of the powertrain components.

As is known in the art, the maximum torque output of the torque converter varies with engine speed and with output speed of the torque converter. The torque produced within the transmission and other powertrain components is a function of the engine speed, torque converter output speed and transmission gear ratio. Ideally, the transmission should be selected so that its components can accept the maximum torque output of the torque converter. However, the maximum torque output may occur over a narrow band of engine output speeds or in a specific gear ratio. At other speeds or in other gear ratios, the torque on the transmission components may be less. For those speeds and gear ratios it would be possible to select less expensive components. Thus, for some applications, it may be preferable to limit the amount of power the engine can produce during certain gear selections and speeds in order to reduce the maximum torque on the transmission and powertrain components. This, in turn, will permit the use of less expensive transmission components.

Prior art controllers are known which limit the engine power output based on gear selection of the transmission. Such controllers may perform satisfactorily on vehicles and other equipment without other systems requiring engine power. For example, on wheel loaders and other equipment with earth moving implements, the implement is typically powered by a hydraulic system that is powered by the engine. In those cases, the power produced by the engine may be demanded by the hydraulic system and not the transmission. Thus, there may be instances when full engine power might damage the transmission components if all of the power is applied to the transmission. However, if the engine power is, at least in part, being diverted to the hydraulic system, then full engine power might be appropriate. Prior art controllers that limit engine power, do not consider hydraulic system power requirements.

One solution might be to include a pressure transducer or other device to sense the power demands of the hydraulic system. However, those sensors are expensive. It would be preferable to have a system that can account for hydraulic system demand using sensors already present on the vehicle and reduce engine power when excessive torque levels might result.

SUMMARY OF THE INVENTION

In one aspect of the present invention an apparatus for limiting the power output of an engine is disclosed. The apparatus includes an electronic controller, a fuel rack associated with the engine, and a gear selector lever positionable at a plurality of positions for indicating a desired gear ratio. An engine speed sensor is connected to said electronic controller and attached to said engine. The electronic controller limits the maximum engine power in response to the gear selector lever being in a predetermined position and the engine speed signal exceeding a first predetermined engine speed value.

In another aspect of the present invention, a engine control for use with an internal combustion engine is disclosed. The engine control includes an electronic controller connected to fuel delivery means and a gear selector. An engine speed sensor is connected to the electronic controller. The electronic engine controller produces a fuel delivery command limiting the maximum fuel delivery in response to the gear selector being in a predetermined position and an engine speed signal being greater than a first predetermined engine speed value.

In yet another aspect of the invention, a method for controlling a solenoid controlled plunger stop of a fuel delivery rack on an internal combustion engine is disclosed. The method includes the steps of determining a selected gear ratio, measuring an engine speed signal and de-energizing the solenoid controlled plunger stop in response to the engine speed exceeding a predetermined engine speed value and the selected gear ratio corresponding to a predetermined gear ratio.

Other aspects and advantages of the present invention will become apparent upon reading the detailed description of the preferred embodiment in conjunction with the drawings and appended claims.

DETAILED DESCRIPTION OF THE PREFERRED EMBODIMENT

Figure 1:
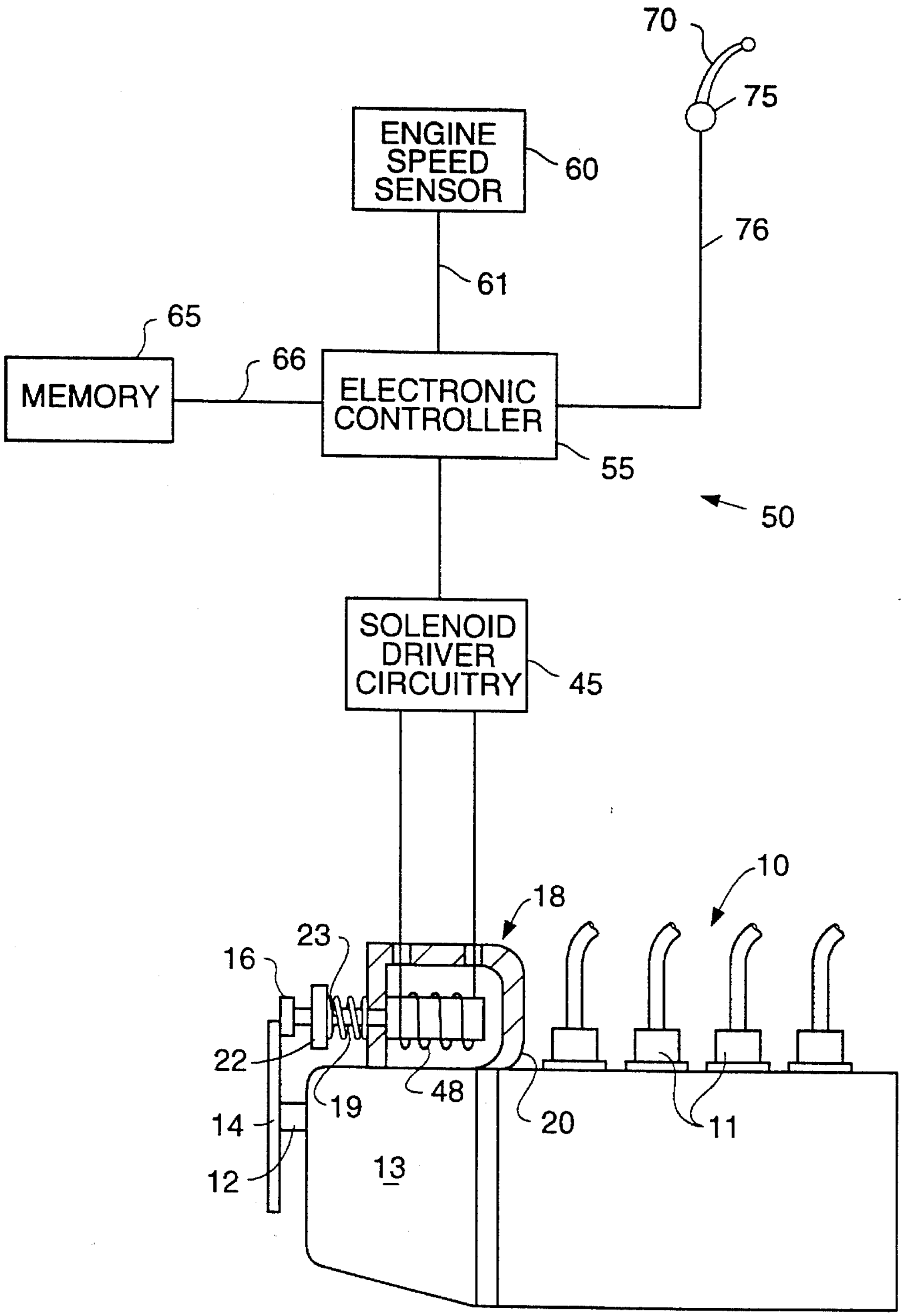
FIG. 1 is a schematic block diagram view of an embodiment of the horsepower limiting engine control of the present invention.

Referring first to FIG. 1, an embodiment of the horsepower limiting engine control 50 of the present invention is shown. In this embodiment, a fuel injection pump assembly 10 is provided. The fuel injection pump assembly 10 preferably has a plurality of pumps 11 which are driven in a conventional manner to provide fuel to each of a plurality of engine cylinders (not shown). A rack bar 12 operatively connects the pumps 11 to a governor 13. The control rack 12 has an extension 14 which is positioned in a manner hereinafter described to limit the maximum amount of fuel that can be delivered to the engine. The moveable stop 16 is operatively connected to a control means such as a solenoid 18. The moveable stop 16 is extended or biased to a first position by means such as a spring 19 disposed between a housing 20 and a shoulder 22 of control rod 23. The moveable stop 16 is biased to a second position upon the solenoid driver circuitry 45 energizing the windings 48 of the solenoid 18.

An electronic controller 55 is electrically connected to an engine speed sensor 60 by an electrical connector 61. In a preferred embodiment, the electronic controller comprises a 68HC11 series microprocessor as manufactured by Motorola, Inc. located in Schaumburg, Ill. However, many other suitable microprocessors are known that could be readily and easily used in connection with the present invention without deviating from the scope of the present invention as defined by the appended claims. The engine speed sensor 60 is connected to the engine (not shown) and produces an engine speed signal on the electrical connector 61 that is a function of the engine speed The electronic controller 55 is preferably connected to a memory device 65 by an electrical connector 66. The memory device 65 generally includes the specific software code for performing an embodiment of the present invention. The software code is shown in flow chart form in FIG. 2 and is described more fully below. Although the memory device 65 is shown as separate from the electronic controller 55, there are electronic controllers known in the art that include memory within the controller. Such devices could be readily and easily used without deviating from the scope of the present invention.

A gear shift device 70 is provided to permit the vehicle operator to select an operative gear ratio from one of a plurality of transmission gear ratios. As is known in the art, the gear shift device 70 is also generally connected either mechanically or electrically to a vehicle transmission to cause the transmission to engage the selected gear ratio. Because transmissions and the linkages between the gear shift device and the transmission are well known, and in themselves do not form part of the present invention, neither is shown in the drawings or described herein. Furthermore, it would be a mechanical step for those skilled in the art to employ the present invention as described herein with known transmissions and linkages. Connected to the gear shift device 70 is a gear position sensor 75 that produces a gear shift position signal on an electrical connector 76. The electrical connector 76 device is connected to the electronic controller 55.

Figure 2:
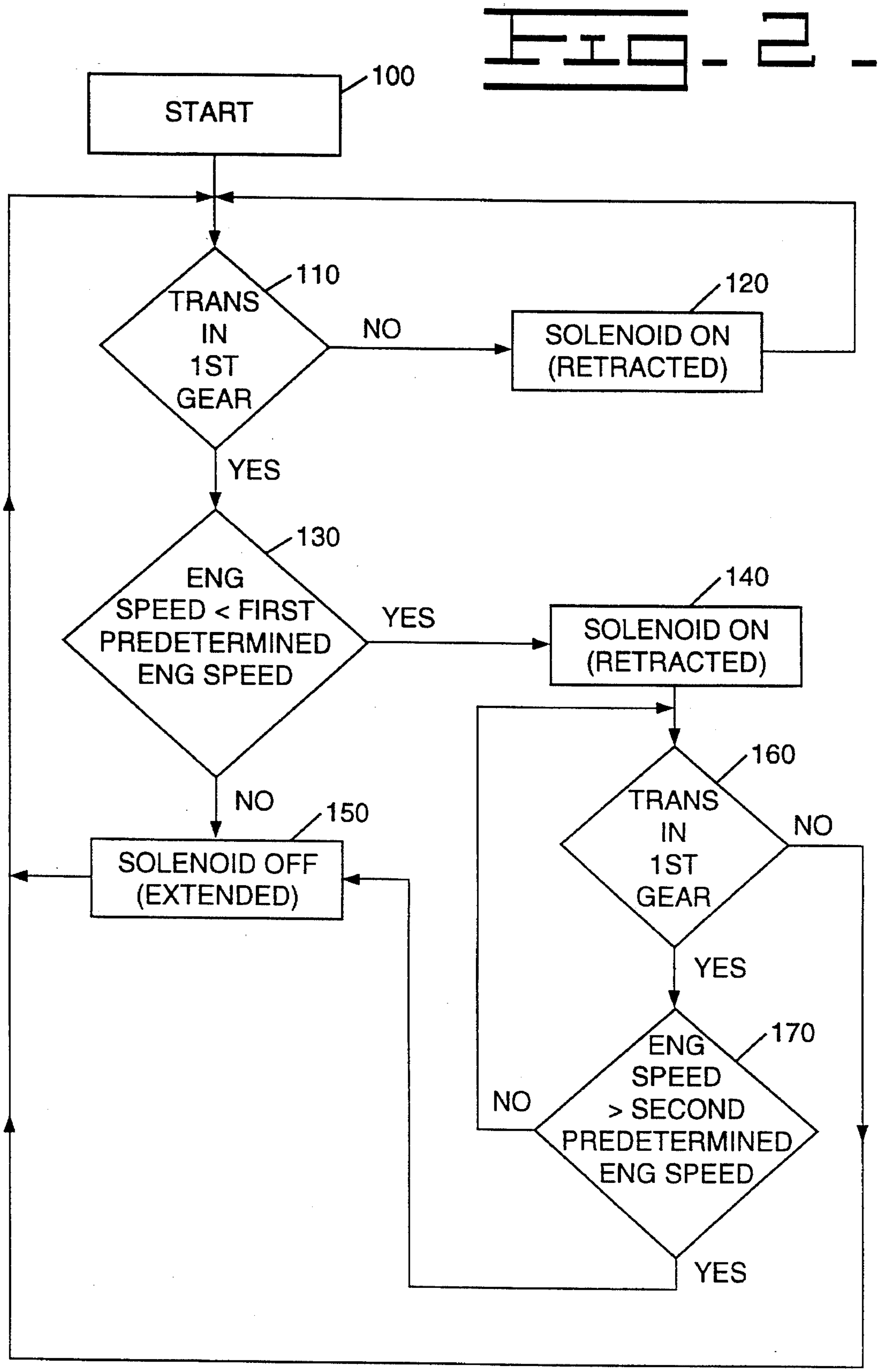
FIG. 2 is a flowchart of the software control of an embodiment of the horsepower limiting engine control of the present invention.

Referring now to FIG. 2, a flowchart of the software control used in connection with a preferred embodiment of the present invention is shown. The detailed program code necessary to practice an embodiment of the invention can be readily and easily written from this flowchart using the assembly language or microcode of the particular microcontroller. Writing such program code from the detailed flowchart is a mechanical step for those skilled in the art.

Program control begins in block 100 and passes to block 110. In block 110, the electronic controller 55 inputs the gear shift position signal on the electrical connector 76 and determines whether the operator has selected first gear. If the operator has not selected first gear and instead has selected second, third, fourth or another gear ratio then program control passes to block 120. Otherwise, if the operator has selected first gear then program control passes to block 130.

In block 120, the engine controller 55 delivers a signal to the solenoid driver circuitry 45 that causes the solenoid driver circuitry 45 to energize the windings 45 of the solenoid 18. The solenoid 18 then causes the moveable stop 16 to be biased against the spring 19 to the second position.

In the second position, the moveable stop permits a greater quantity of fuel to be delivered to the engine cylinders than if the solenoid is not engaged and the moveable stop is in the first position. Thus, by energizing the solenoid 18, the engine is able to produce more power than if the solenoid 18 is not energized.

In block 130, the electronic controller 55 inputs the engine speed signal on connector 61. The electronic controller 55 compares the engine speed signal to a first predetermined engine speed value. If the engine speed signal on connector 61 is less than the first predetermined engine speed value, then program control passes to block 140, otherwise program control passes to block 150. In a preferred embodiment, when the horsepower limiting engine control 50 of the present invention is used on a 970 F Wheel Loader manufactured by Caterpillar Inc., the first predetermined engine speed value is approximately 1800 revolutions per minute. However, that value can be readily and easily modified for use with other equipment without deviating from the scope of the present invention as defined by the appended claims. Other equipment having different hydraulic loads and capabilities and different engine/torque converter/transmission combinations will necessarily have different first and second predetermined engine speed values. The method of calculating those specific values is discussed below with reference to block 170.

In block 140, the electronic controller 55 issues a command to the solenoid driver circuitry 45 that causes the windings 48 of the solenoid 18 to be energized. Energizing the solenoid 18 causes the moveable stop to be biased to the second position thereby permitting the engine to operate at a higher horsepower level.

In block 150, the electronic controller 55 causes the solenoid driver circuitry to de-energize the solenoid 18. The moveable stop 16 is then biased by the spring 19 to the first position. In the first position, the moveable stop 16 limits the movement of the control rack 12 to thereby limit the power output of the engine. From block 150, program control returns to block 110.

As described above, once program control passes from block 130 to block 140 the solenoid 18 is energized. From block 140, program control passes to block 160. In block 160, the electronic controller 55 reads the gear shift position signal on connector 76. If the selected gear is first gear then program control passes to block 170. Otherwise program control passes to block 110.

In block 170, the electronic controller reads the engine speed signal produced by the engine speed sensor 60 on the electrical connector 61. If the engine speed signal is greater than or equal to a second predetermined engine speed value, then program control passes to block 150. Otherwise program control passes back to block 170. This portion of the flowchart illustrates that once the solenoid is energized it will remain energized until the engine speed exceeds the second predetermined engine value. Then, program control passes to block 150. In block 150, the solenoid 18 is de-energized. The spring 19 biases the moveable stop 16 to the first position thereby limiting the power output of the engine.

As noted above, an embodiment of the present invention has been implemented on a model 970 F Wheel Loader manufactured by Caterpillar Inc. A preferred value for the second predetermined engine speed value on a 970 F Wheel Loader corresponds to an engine speed of about 2000 revolutions per minute. However, when an embodiment of the present invention is used with other equipment having other hydraulic systems and other engine/torque converter/transmission combinations, the preferred values for the first and second predetermined engine speed values will change. Those values can be readily and easily determined and used in connection with the present invention for such other equipment.

The first and second predetermined engine speed values are selected to permit the operator to use full rated engine power in most instances. The engine power is then reduced slightly during those operating conditions that might produce torque converter output levels that exceed the rating of the transmission components. Typically the torque converter output levels are at a maximum when the hydraulic system is not demanding engine power and the torque converter output speed is zero (i.e. the torque converter is stalled). In that case, all engine power is being transmitted to the torque converter. Since the torque converter output is roughly proportional to the engine speed input, the torque converter output torque can be limited by limiting engine speed. In an embodiment of the present invention the engine speed is limited by limiting the engine horsepower.

To determine the second predetermined engine speed, it is first necessary to measure the engine speed that produces the maximum acceptable torque converter output when the torque converter is stalled. This value is generically referred to as the low horsepower torque converter stall engine speed. For example, in the 970 F Wheel Loader, the engine speed that produces acceptable torque converter outputs at torque converter stall is 2050 RPM.

Once the low horsepower torque converter stall engine speed is determined, it is then necessary to determine the engine power that will produce that engine speed. That engine power setting is the maximum permitted engine power when the moveable stop 16 is extended as described in block 150. Thus, the moveable stop 16 is extended to limit the engine power output so that the engine speed will not exceed the low horsepower torque converter stall engine speed. In contrast, if the full rated engine power were applied the engine speed would exceed the low horsepower torque converter stall engine speed thereby producing torque converter outputs that exceed the transmission ratings.

The second predetermined engine speed value is then selected to be less than the low horsepower torque converter stall speed. This permits sufficient response time for the horsepower limiting engine control 50 of the present invention to make the transition from full rated engine power (solenoid energized, moveable stop retracted) to a lower horsepower setting (solenoid de-energized, moveable stop extended). For example, in the 970 F Wheel Loader, engine speed is typically low when the hydraulic system is demanding power and the equipment operator is simultaneously trying to push the equipment into a pile of dirt. In this instance the moveable stop 16 is retracted and the horsepower limiting engine control 50 permits the engine to operate at full rated horsepower. Then, as the hydraulic demand is removed, engine speed increases. In a preferred embodiment, used in connection with the 970 F Wheel Loader, the second predetermined engine speed value is selected as 2000 RPM. Thus, when the engine speed reaches 2000 RPM the electronic controller 55 de-energizes the solenoid 18, thereby extending the moveable stop 16 and limiting engine power. The 50 RPM difference between the low horsepower torque converter stall engine speed and the second predetermined engine speed value provides the lag time that is required to extend the moveable stop 16 to limit the engine power. By beginning to limit horsepower when engine speed reaches 2000 RPM, the electronic controller helps insure that the engine speed does not exceed 2050 RPM.

The first predetermined engine speed is then selected as a function of the second predetermined engine speed. The first predetermined engine speed value is selected to be less than the second predetermined engine speed value by an amount sufficient to account for engine speed differences caused by a low horsepower to high horsepower transition, and to allow for hysteresis.

For example, in a preferred embodiment implemented on a 970 F Wheel Loader, the difference in engine speed during torque converter stall between full rated engine power and the limited horsepower is about 70 RPM. Thus, if the engine speed is 1800 RPM when the engine power is limited, shifting to full rated engine power will produce an output of 1870 RPM. Thus, in this application, the first predetermined engine speed value must be at least 70 RPM less than the second predetermined engine speed value. Thus, in the 970 F, the first predetermined engine speed value must be less than 1930 RPM. It is preferable to reduce the first predetermined engine speed further to allow for hysteresis. Thus, in the 970 F, the first predetermined engine speed value is selected as 1800 RPM.

By following the foregoing detailed description of the selection of the first and second engine speed values, one skilled in the art can readily and easily modify those values to use an embodiment of the present invention on other equipment. Those values can then be readily and easily used in connection with a preferred embodiment to reduce the engine power output to help insure that the torque converter does not produce torque levels beyond the ratings of the transmission components.

INDUSTRIAL APPLICABILITY

An embodiment of the present invention helps prevent excessive torque levels from damaging transmission components, while at the same time permitting the engine to produce maximum power based on hydraulic system demand.

The present invention reduces the amount of engine power produced during periods when excessive torque might be created in the transmission. An embodiment of the present invention has been implemented on a 970 F Wheel Loader manufactured by Caterpillar Inc., located in Peoria, Ill. As described above, the control 50 determines the transmission gear ratio in which the vehicle is being operated and permits the engine to operate at full rated power when the selected gear ratio is other than first gear. When the equipment is operated in first gear and the engine speed falls below 1800 RPM then the electronic controller energizes the solenoid to permit the engine to operate at full rated power. Engine/torque converter output torque at engine speeds above a second predetermined level (in a preferred embodiment 2000 RPM) may expose powertrain components to excessive torque levels. This excessive torque may also result in wheel slip and shortened tire life. When the transmission is in first gear and the solenoid has been energized, it will thereafter be de-energized when the engine speed exceeds 2000 RPM.

We claim:

1. An apparatus for limiting the power output of an engine, comprising:

an electronic controller;

a fuel rack associated with the engine;

a gear selector lever positionable at a plurality of positions for indicating a desired gear ratio;

an electronically controlled plunger connected to said electronic controller, said plunger having a first position and a second position;

an engine speed sensor connected to said electronic controller and attached to said engine, wherein said engine speed sensor produces an engine speed signal as a function of engine speed;

wherein said electronically controlled plunger is positioned at a first position in response to the gear selector lever being in a predetermined position and the engine speed signal exceeding a first predetermined engine speed value; and wherein said electronically controlled plunger limits the maximum position of the fuel rack when the electronically controlled plunger is in said first position.

2. The apparatus according to claim 1, wherein:

said electronic controller biases said electronically controlled plunger to the second position in response to said gear selector being in said predetermined position and said engine speed signal being less than said first predetermined engine speed value.

3. The apparatus according to claim 2, wherein:

said electronic controller biases said electronically controlled plunger from said first position to said second position in response to said gear selector lever not being in said predetermined position.

4. The apparatus according to claim 3 wherein said first predetermined engine speed value corresponds to a value of approximately 1800 revolutions per minute.

5. The apparatus according to claim 4 wherein said second predetermined engine speed value corresponds to a value of approximately 2000 revolutions per minute.

6. The apparatus according to claim 5, wherein said predetermined position corresponds to a gear selector position of first gear.

7. The apparatus according to claim 2, wherein said electronic controller biases said electronically controlled plunger from said second position to said first position in response to said engine speed signal exceeding a second predetermined engine speed level.

8. The apparatus according to claim 1, wherein said electronic controller biases said plunger to said second position in response to said gear selector lever being in a position other than said predetermined position.

9. An engine control for use with an internal combustion engine, comprising:

an electronic controller;

fuel delivery means connected to said controller for delivering fuel to the engine;

a gear selector, said gear selector being positionable at a plurality of positions;

an engine speed sensor connected to said electronic engine controller, said engine speed sensor producing an engine speed signal;

wherein said electronic engine controller produces a fuel delivery command and said controller limits the maximum fuel delivery command in response to said gear selector being in a predetermined position and said engine speed signal greater than a first predetermined engine speed value.

10. The apparatus according to claim 9, wherein said electronic controller permits a maximum fuel delivery command in response to said gear selector being in said predetermined position and said engine speed signal being less than a first predetermined engine speed value.

11. The apparatus according to claim 10, wherein said electronic controller limits the maximum fuel delivery command in response to said engine speed exceeding a second predetermined engine speed value.

12. The apparatus according to claim 11, wherein said electronic controller permits a maximum fuel delivery command in response to said gear selector being in a position other than said predetermined position.

13. The apparatus according to claim 12, wherein said first predetermined engine speed value corresponds to a value of approximately 1800 revolutions per minute.

14. The apparatus according to claim 13, wherein said second predetermined engine speed value corresponds to a value of approximately 2000 revolutions per minute.

15. The apparatus according to claim 14, wherein said predetermined position corresponds to a gear selector position of first gear.

16. The apparatus according to claim 9, wherein said electronic controller permits a maximum fuel delivery command in response to said gear selector being in a position other than said predetermined position.

17. A method for controlling a solenoid controlled plunger stop of a fuel delivery rack on an internal combustion engine, said internal combustion engine including an electronic controller, fuel delivery means connected to said controller, an engine speed sensor, said engine speed sensor producing an engine speed signal, a transmission with a plurality of gear ratios and gear selection means for selecting one of said plurality of gear ratios, said method comprising the steps of:

determining the selected gear ratio of the plurality of gear ratios;

measuring the engine speed signal;

comparing said engine speed signal to a predetermined engine speed value;

de-energizing said solenoid controlled plunger stop in response to said engine speed exceeding said first predetermined engine speed value and said selected gear ratio corresponding to a predetermined gear ratio; and wherein said plunger stop limits the travel of the fuel delivery rack.

18. The method according to claim 17, including the steps of:

energizing the solenoid controlled plunger in response to said engine speed being less than said first predetermined engine speed value and said selected gear ratio corresponding to other than the predetermined gear ratio; and wherein said plunger stop permits free travel of the fuel delivery rack.

19. The method according to claim 18, including the steps of:

de-energizing the solenoid controlled plunger subsequent to said step of energizing in response to said engine speed exceeding a second predetermined engine speed value or said selected gear ratio being other than said predetermined gear ratio.

20. The apparatus according to claim 19, wherein said first predetermined engine speed value corresponds to a value of approximately 1800 revolutions per minute.

21. The apparatus according to claim 20, wherein said second predetermined engine speed value corresponds to a value of approximately 2000 revolutions per minute.

22. The apparatus according to claim 21, wherein said predetermined position corresponds to a gear selector position of first gear.

* * * * *